J. BLOMGREN.
Compass.
No. 108,555.  Patented Oct. 25, 1870.
Fig. 1.
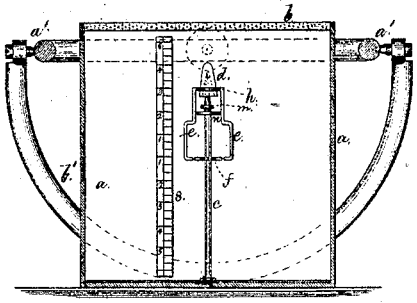
Fig. 2.
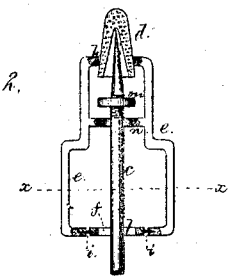
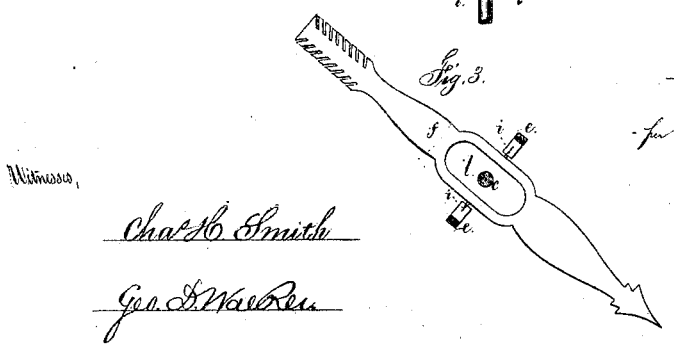
Fig. 3.
Witnesses,
Chas. H. Smith
Geo. D. Walker
John Blomgren
pr Lemuel W. Serrell
atty.

United States Patent Office.

JOHAN BLOMGREN, OF NEW YORK, N. Y.

Letters Patent No. 108,555, dated October 25, 1870.

IMPROVEMENT IN COMPASSES FOR MINING.

The Schedule referred to in these Letters Patent and making part of the same.

*To all whom it may concern:*

Be it known that I, JOHAN BLOMGREN, of the city and State of New York, have invented a certain new and useful Improvement in Compasses for Mining and other purposes; and the following is hereby declared to be a full and correct description of the same.

Compasses for mining and other purposes have heretofore been constructed so that the needle, as influenced by magnetic currents, moved horizontally upon a vertical pivot, similar to that in the ordinary mariner's compass, and swung in a vertical plane, when influenced by local attraction or magnetic currents.

In the neighborhood of ore-beds, especially iron, there are local attractions and magnetic currents, and a compass to be practically available, when used either for seeking for ore-beds, or in mines, when tracking the path of a vein of ore, the needle has to be hung in such a manner that it will be very sensitive, and either oscillate or rise and fall with the slightest change in the direction of the magnetic current.

The compasses heretofore constructed for this purpose have been imperfect in their working, in consequence of the weight and friction of the parts that sustained the magnetic needle, and said parts were liable to get out of order, and costly in their construction.

My improvement relates to the construction of the mechanism that sustains the magnetic needle, whereby I reduce the weight, lessen the danger of the parts becoming deranged, and materially cheapen the cost of construction.

In the drawing—

Figure 1 is a vertical section of a compass fitted with my said improvement;

Figure 2 is an elevation partly in section, of the device for sustaining the magnetic needle; and Figure 3 is a sectional plan at the line $x\,x$.

Figs. 2 and 3 are in enlarged size.

$a$ is the case of the compass, of cylindrical form, and in the upper part of the same the glass $b$ is secured in any convenient manner.

The usual compass-card is permanently attached to the bottom of the compass-case $a$, and said case $a$ is fitted with the gimbal $a'$ and bail $b'$, by which the compass may be carried, and hang level, or nearly so.

From the bottom of said case the rod or pivot $c$ rises, and the upper part of said pivot is pointed to receive the bearing $d$. This bearing $d$ is of glass, or other suitable material, and of a hollow conical shape.

The yoke $e$, for sustaining the magnetic needle $f$, is formed at the upper part with a ring, $h$, to set over and around the cone-shaped bearing $d$, and the lower part of said yoke receives the horizontal pivots or centers $i\,i$ of the needle $f$, and on these centers $i\,i$ the said needle swings vertically, as said needle is influenced by local attraction or magnetic currents.

The said needle assumes a greater or lesser inclination according to the strength and direction of the magnetic current or the local attraction.

The needle $f$ is formed with an opening, $l$, so as to set around the spindle, and allow the free movement of the needle, without said needle coming in contact with the pivot $c$.

To prevent the yoke $e$ and bearing $d$ being disconnected from each other or from the pivot $c$, I attach to the pivot $c$ a disk, $m$, above the ring $n$ of the yoke $e$, and the spindle $c$ at this part may be formed with a screw-thread, to receive the disk $m$, and allow for the adjustment of said disk upon the spindle, with reference to the ring $n$ upon the yoke $e$.

This ring $n$ surrounds the spindle $c$, and is formed with or firmly attached to said yoke $e$, and the opening in said ring is of a less diameter than the disk $m$; hence said ring $n$ and yoke $e$ are limited in their upward movement by said disk $m$.

It will now be understood that the spindle $c$ supports the yoke $e$ and bearing $d$; that the yoke $e$ sustains the needle $f$, and that the bearing $d$ and yoke $e$ turn with the needle $f$ in its horizontal movement, and that said needle, as it dips or inclines more or less, swings upon the centers $i\,i$; that the cone shape of the bearing $d$ will only allow said yoke to descend to a certain point, and that said yoke cannot rise beyond a certain point, in consequence of the disk $m$ acting as a stop to the ring $n$ of the yoke $e$, and that, by this means, the derangement of the parts is effectually prevented.

In my compass the parts can be constructed very light and cheap, and there will be the utmost freedom of motion, so that the needle will be influenced by the slightest magnetic current.

I provide a scale, $s$, upon the inside of the case $a$, and suitably marked, to indicate in numbers or degrees the inclination or dip of the needle.

I claim as my invention—

1. The needle $f$, hung upon horizontal pivots $i\,i$ in the yoke $e$, in combination with the ring $n$ and disk $m$ on the pivot $c$, substantially as and for the purposes specified.

2. A conical hollow glass bearing, $d$, over which the yoke $e$ is suspended, in combination with the vertical pivot $c$ and horizontal pivots $i\,i$, for the compass-needle $f$, as set forth.

In witness whereof, I have hereunto set my signature this 22d day of March, A. D. 1870.

JOHAN BLOMGREN.

Witnesses:
CHAS. H. SMITH,
GEO. T. PINCKNEY.